United States Patent
Mevius et al.

(10) Patent No.: US 8,840,349 B2
(45) Date of Patent: Sep. 23, 2014

(54) MULTI-TOOL ADJUSTING SCREW

(75) Inventors: Jason Scott Mevius, McKinney, TX (US); Gregory Lawrence Foust, Plano, TX (US); James Chester Hawkins, Allen, TX (US)

(73) Assignee: Fisher Controls International, LLC, Marshalltown, IA (US)

( * ) Notice: Subject to any disclaimer, the term of this patent is extended or adjusted under 35 U.S.C. 154(b) by 893 days.

(21) Appl. No.: 12/098,568

(22) Filed: Apr. 7, 2008

(65) Prior Publication Data

US 2008/0256754 A1    Oct. 23, 2008

Related U.S. Application Data

(60) Provisional application No. 60/913,084, filed on Apr. 20, 2007.

(51) Int. Cl.
*F16B 23/00* (2006.01)
*B25B 13/50* (2006.01)
*B25B 13/06* (2006.01)

(52) U.S. Cl.
CPC ............ *B25B 13/06* (2013.01); *B25B 13/50* (2013.01); *F16B 23/0092* (2013.01)
USPC ............................. 411/410; 411/402; 411/403

(58) Field of Classification Search
USPC .............. 411/410, 402–405; 16/404
See application file for complete search history.

(56) References Cited

U.S. PATENT DOCUMENTS

| 161,390 | A | * | 3/1875 | Cummings | 411/407 |
|---|---|---|---|---|---|
| 1,076,512 | A | * | 10/1913 | Murphy | 137/321 |
| 1,261,916 | A | * | 4/1918 | Forbes | 411/402 |
| 2,169,460 | A | * | 8/1939 | Broughton | 411/403 |
| 2,173,707 | A | | 9/1939 | Brown | |
| 2,279,118 | A | * | 4/1942 | Fortune et al. | 81/176.15 |

(Continued)

FOREIGN PATENT DOCUMENTS

| JP | 36-29913 B | 11/1961 |
|---|---|---|
| JP | 40-5961 B | 2/1965 |

(Continued)

OTHER PUBLICATIONS

Fisher Controls International, LLC, "Type S201 and S202 Gas Regulators," Fisher Regulators Instruction Manual, issued in Sep. 1981 (8 pages).

(Continued)

*Primary Examiner* — Roberta Delisle
(74) *Attorney, Agent, or Firm* — Hanley, Flight & Zimmerman, LLC.

(57) ABSTRACT

An adjusting screw configured to be adjustable by multiple different tools is described. An example adjusting screw includes a cylindrical body portion having a first end, a second end, and an outer curved surface. The example adjusting screw also includes a first raised portion on the first end and offset from a longitudinal axis of the cylindrical body and a second raised portion on the first end and offset from the longitudinal axis of the cylindrical body and opposing the first raised portion. Each of the first and second raised portions is configured to engage a first socket to turn the cylindrical body about the longitudinal axis. Additionally, the first and second raised portions are configured to engage a second socket larger than the first socket to turn the cylindrical body about the longitudinal axis.

28 Claims, 3 Drawing Sheets

(56) References Cited

U.S. PATENT DOCUMENTS

| | | | |
|---|---|---|---|
| D136,659 S * | 11/1943 | Janning et al. | D9/439 |
| 2,338,023 A * | 12/1943 | Bugg | 411/403 |
| 3,470,786 A * | 10/1969 | Martins | 411/405 |
| 3,656,396 A * | 4/1972 | Gutshall | 411/403 |
| 3,854,372 A * | 12/1974 | Gutshall | 411/1 |
| 4,041,834 A * | 8/1977 | Herkes et al. | 411/82.2 |
| 4,109,691 A * | 8/1978 | Wilson | 81/119 |
| 4,444,301 A * | 4/1984 | Granberry | 193/35 R |
| 4,754,749 A * | 7/1988 | Tsou | 606/304 |
| 4,982,759 A | 1/1991 | Scaramucci | |
| 5,020,954 A | 6/1991 | Dreger | |
| 5,029,808 A | 7/1991 | McCauley | |
| 5,269,208 A * | 12/1993 | Kolvites et al. | 81/176.2 |
| 5,358,368 A * | 10/1994 | Conlan et al. | 411/410 |
| 5,638,727 A * | 6/1997 | Gringer | 81/438 |
| 5,647,712 A | 7/1997 | Demirdogen et al. | |
| 5,832,952 A | 11/1998 | Cook et al. | |
| 5,871,031 A | 2/1999 | Greinacher | |
| 5,918,626 A | 7/1999 | Strong et al. | |
| 5,924,676 A | 7/1999 | Cook et al. | |
| 6,024,117 A | 2/2000 | Tomita et al. | |
| 6,077,267 A * | 6/2000 | Huene | 606/916 |
| 6,293,745 B1 * | 9/2001 | Lu | 411/410 |
| 6,745,649 B1 | 6/2004 | Liao | |
| 6,792,838 B2 * | 9/2004 | Brooks et al. | 81/439 |
| 6,852,037 B2 | 2/2005 | Hughes | |
| 6,889,580 B1 * | 5/2005 | Tseng | 81/124.6 |
| 6,889,702 B2 | 5/2005 | Hall et al. | |
| 6,890,139 B2 | 5/2005 | Hughes | |
| 6,988,432 B2 * | 1/2006 | Brooks | 81/439 |
| 7,097,404 B2 * | 8/2006 | Avganim | 411/403 |
| D535,180 S * | 1/2007 | Tibbenham et al. | D8/382 |
| 7,883,308 B2 * | 2/2011 | Hung | 411/393 |
| 2003/0042120 A1 | 3/2003 | Seki | |
| 2005/0106952 A1 | 5/2005 | Maxwell et al. | |
| 2005/0158148 A1 * | 7/2005 | Brooks | 411/403 |
| 2008/0185840 A1 * | 8/2008 | Menor | 285/256 |
| 2008/0279653 A1 * | 11/2008 | Brooks | 411/403 |
| 2011/0116895 A1 * | 5/2011 | Garver | 411/402 |

FOREIGN PATENT DOCUMENTS

| | | |
|---|---|---|
| JP | 59-56408 U1 | 4/1984 |
| JP | 60-133211 U1 | 9/1985 |
| JP | 61-29115 U1 | 2/1986 |
| WO | 02093284 | 11/2002 |

OTHER PUBLICATIONS

Photograph of a portion of an adjusting screw used in a Fisher Type HSR Regulator (1 page).

Photograph of a portion of an adjusting screw used in a Fisher Type S300 Regulator (1 page).

Photograph of a portion of an adjusting screw used in a Fisher Type S200 Regulator (1 page).

Photograph of a portion of an adjusting screw used in an Actaris Type B31 Regulator (1 page).

Photograph of a portion of an adjusting screw used in an Actaris Type B34/B38 Regulator (1 page).

Photograph of a portion of an adjusting screw used in a Bryan Donkin/RMG Regulator (1 page).

Photograph of a portion of an adjusting screw used in a Tartarini Type A100 Regulator (1 page).

Photograph of a portion of an adjusting screw used in a Fiorentini Dival 160/250 Regulator (1 page).

Photograph of a portion of an adjusting screw used in a Francel Type Regal 2 Regulator (1 page).

Photograph of a portion of an adjusting screw used in a Francel Type Regal 3 Regulator (1 page).

Japanese Patent Office, "Notice of Reasons for Rejection", issued in connection with JP Patent Application No. 2010-504219, English translation, mailed Dec. 4, 2012. (3 pages).

European Patent Office, "Office Action", issued in connection with EP Patent Application No. 08745995.4, mailed on May 2, 2013. (4 pages).

Japanese Patent Office, "Office Action," issued in connection with Japanese application serial No. 2010-504219, issued Dec. 4, 2012, 3 pages.

Japanese Patent Office, Japanese Examined Utility Model Application Publication No. SHO 40-005961, cited in the Japanese office action in connection with Japanese application No. 2010-504219, issued Dec. 4, 2010, 2 pages.

Japanese Patent Office, Japanese Utility Model Application Publication No. SHO 60-133211, cited in the Japanese office action in connection with Japanese application No. 2010-504219, issued Dec. 4, 2010, 14 pages.

Japanese Patent Office, Japanese Utility Model Application Publication No. SHO 59-056408, cited in the Japanese office action in connection with Japanese application No. 2010-504219, issued Dec. 4, 2010, 3 pages.

Japanese Patent Office, Japanese Utility Model Application Publication No. SHO 61-029115, cited in the Japanese office action in connection with Japanese application No. 2010-504219, issued Dec. 4, 2010, 7 pages.

Japanese Patent Office, Japanese Examined Utility Model Application Publication No. SHO 36-029913, cited in the Japanese office action in connection with Japanese application No. 2010-504219, issued Dec. 4, 2010, 1 page.

State Intellecutal Property Office of P.R. China, "Third Office Action," English translation, issued in connection with application serial No. 200880011137.X, issued Apr. 12, 2012, 3 pages.

State Intellecutal Property Office of P.R. China, "Second Office Action," English translation, issued in connection with application serial No. 200880011137.X, issued Sep. 1, 2011, 4 pages.

State Intellecutal Property Office of P.R. China, "First Office Action," English translation, issued in connection with application serial No. 200880011137.X, issued Dec. 27, 2010, 9 pages.

* cited by examiner

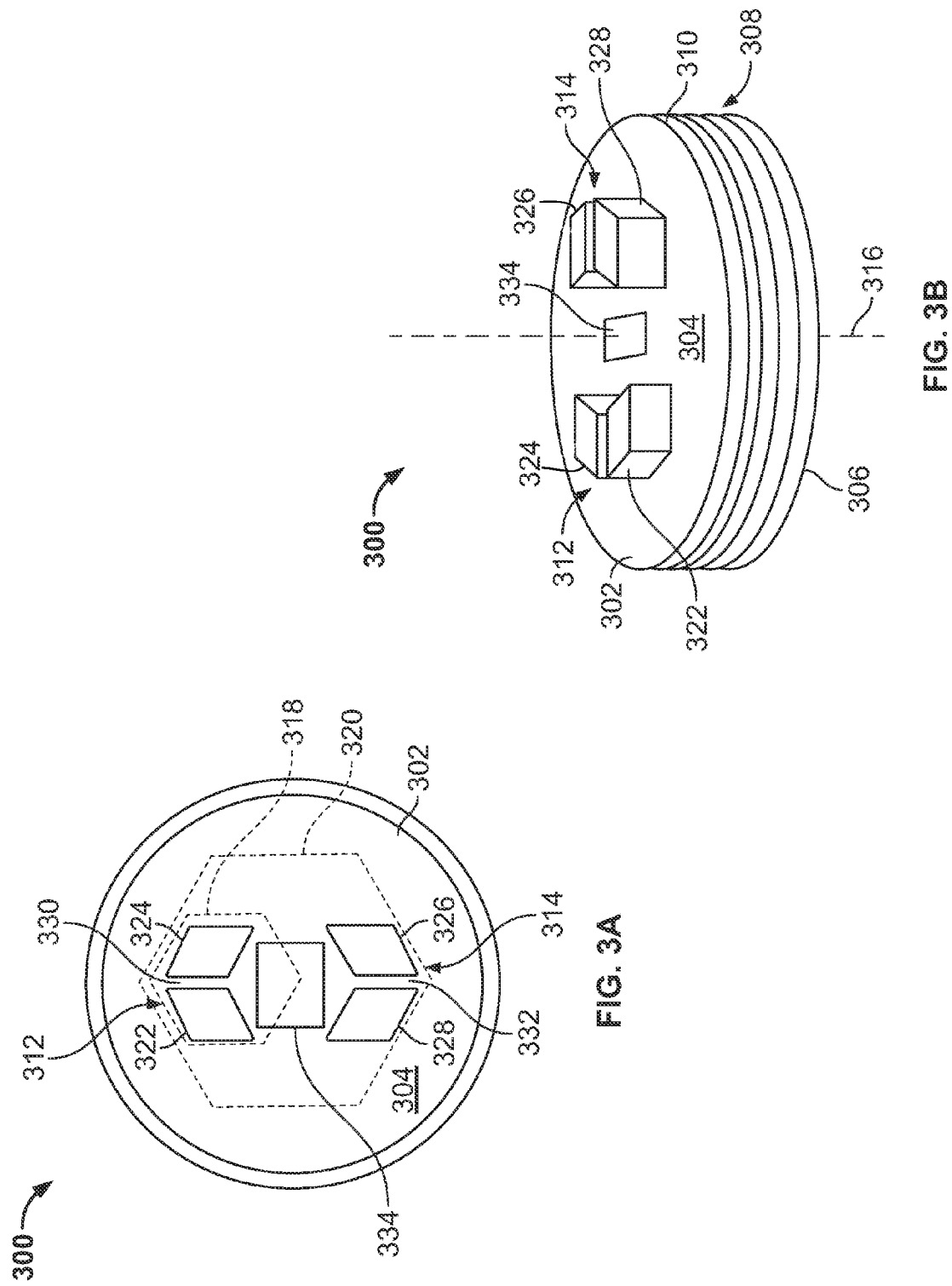

MULTI-TOOL ADJUSTING SCREW

This application claims the benefit of U.S. Provisional Patent Application Ser. No. 60/913,084, filed on Apr. 20, 2007, which is hereby incorporated herein by reference in its entirety.

FIELD OF THE DISCLOSURE

The present disclosure relates generally to adjusting screws and, more particularly, to an adjusting screw configured to be adjustable by multiple different tools.

BACKGROUND

Process control systems utilize a variety of field devices to control process parameters. Many types and sizes of motors, temperature sensors, pressure sensors, fluid valves and/or regulators, etc. are typically distributed throughout process control systems. Often, replacement, repair, and maintenance of a particular field device (e.g., a fluid regulator) require a field technician to carry numerous tools. For instance, certain tools may be needed to replace a field device; other additional tools may be needed to repair the device (e.g., to replace a diaphragm or other component); and still other additional tools may be needed to maintain (e.g., adjust, calibrate, etc.) the device. Such a large assortment of tools is inconvenient, cumbersome, and costly, particularly when each different type of field device requires a similar corresponding assortment of tools.

To address the need to reduce the number of tools needed to replace, repair, and maintain field devices, some manufacturers have configured their field devices so that multiple different tools may be used to, for example, make adjustments (e.g., to an adjusting screw) to the field devices. For example, an adjusting screw may include a boss to receive a socket wrench as well as a slot to receive a screwdriver blade, thereby providing a field technician a way of making an adjustment using a tool that might otherwise be carried to replace the device, service another component of the device, or which is a more general purpose tool for use with a number of different field devices (e.g., a screwdriver as opposed to a particular size socket wrench).

However, while some field devices provide adjustment mechanisms that enable a field technician to use any one of multiple different tools, many of these adjustment mechanisms do not meaningfully reduce the number of tools that a field technician must ultimately possess.

SUMMARY

In one described example, an adjusting screw includes a cylindrical body portion having a first end, a second end, and an outer curved surface. At least a portion of the outer curved surface has threads to engage an internally threaded opening. The example adjusting screw also includes a first raised portion on the first end and offset from a longitudinal axis of the cylindrical body and a second raised portion on the first end and offset from the longitudinal axis of the cylindrical body and opposing the first raised portion. Each of the first and second raised portions is configured to engage a first socket to turn the cylindrical body about the longitudinal axis. Additionally, the first and second raised portions are configured to engage a second socket larger than the first socket to turn the cylindrical body about the longitudinal axis.

In another described example, an adjusting screw includes a cylindrical body portion having a first end, a second end, a longitudinal axis, and an outer curved surface. At least a portion of the outer curved surface has threads to engage an internally threaded opening. Additionally, the cylindrical body has a rectangular opening configured to directly engage a socket wrench drive member to rotate the cylindrical body about the longitudinal axis.

In yet another described example, an adjusting screw for use with a regulator valve includes means for adjustably engaging an threaded opening of the fluid regulator and means for engaging first and second sockets, wherein the first socket has a first size and the second socket has a second size larger than the first size.

BRIEF DESCRIPTION OF THE DRAWINGS

FIGS. 3A and 3B illustrate an example adjusting screw described herein.

DETAILED DESCRIPTION

An example adjusting screw configured to be adjustable by multiple tools is described herein. In contrast to known adjusting screws, the example adjusting screw described herein is configured to engage two differently sized sockets or socket wrenches, both of which may otherwise typically be carried by a service technician to replace, service, or maintain a device associated with the example adjusting screw. For example, in the case where the example adjusting screw is used to adjust a control or set pressure of a fluid regulator (e.g., a gas regulator), the example adjusting screw may be adjustable (e.g., rotatable about a longitudinal axis of the screw) using a first socket wrench or socket that is also sized to engage flange bolts of the fluid regulator. The example adjusting screw may also be adjustable by a second socket that is sized for use with a valve port of the fluid regulator. Still further, the example adjusting screw may provide a rectangular (e.g., a square) opening to receive a socket drive member (e.g., a square drive of a socket wrench or socket wrench extension) to adjust the screw. Additionally, the example adjusting screw may include a screwdriver slot or slots to receive a screwdriver blade to enable a field technician or service personnel to adjust the screw using a screwdriver commonly carried by service personnel.

Thus, the example adjusting screw described herein may be used with field devices to reduce the number and/or variety of tools needed by a service person to service those field devices, thereby reducing the overall cost of servicing such devices (e.g., by reducing costs associated with the purchase of tools and/or carrying large numbers of tools).

Figure 1:
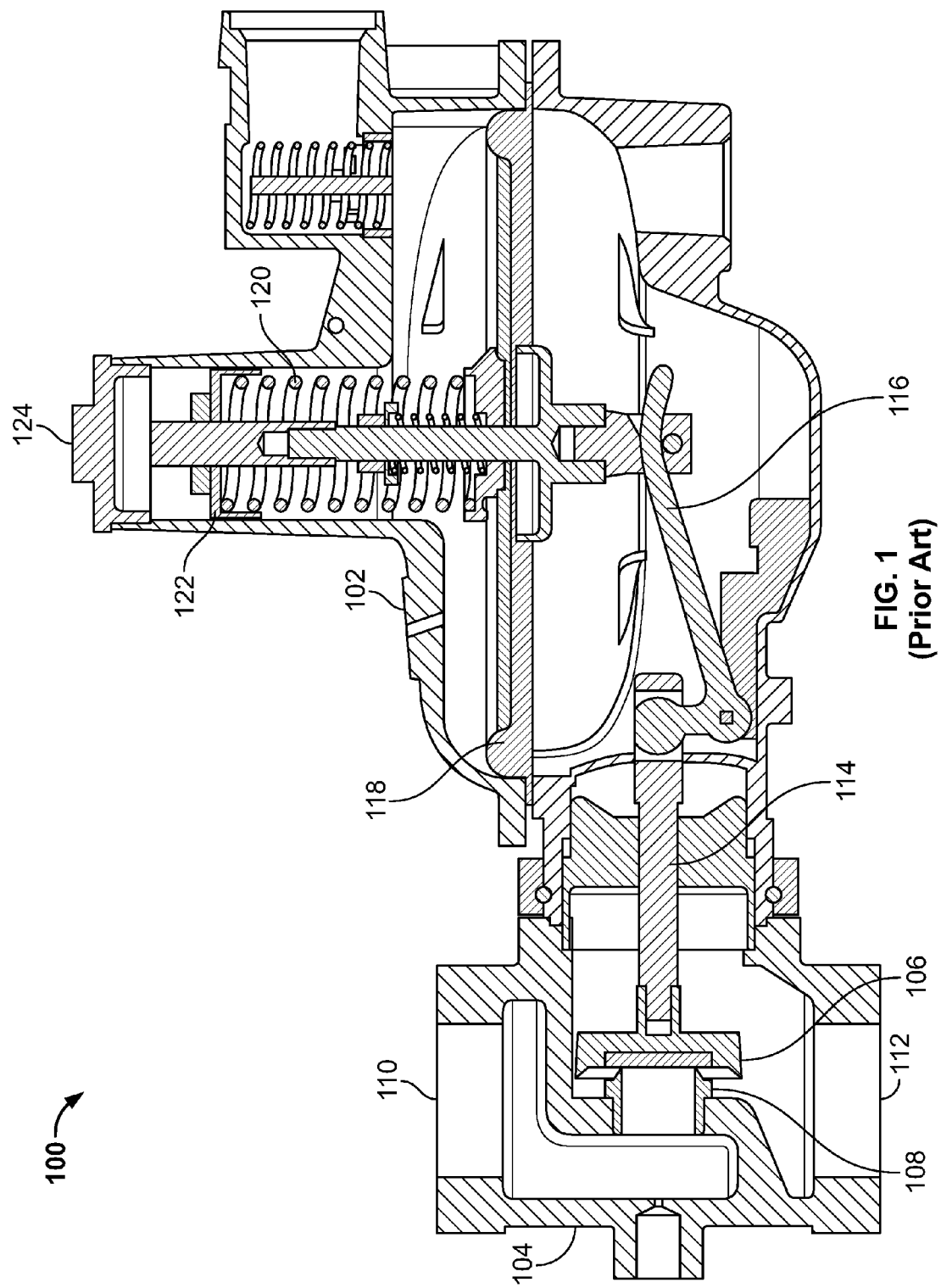
FIG. 1 is a cross-sectional view of a fluid regulator having a known adjusting screw configuration.
Figure 2:
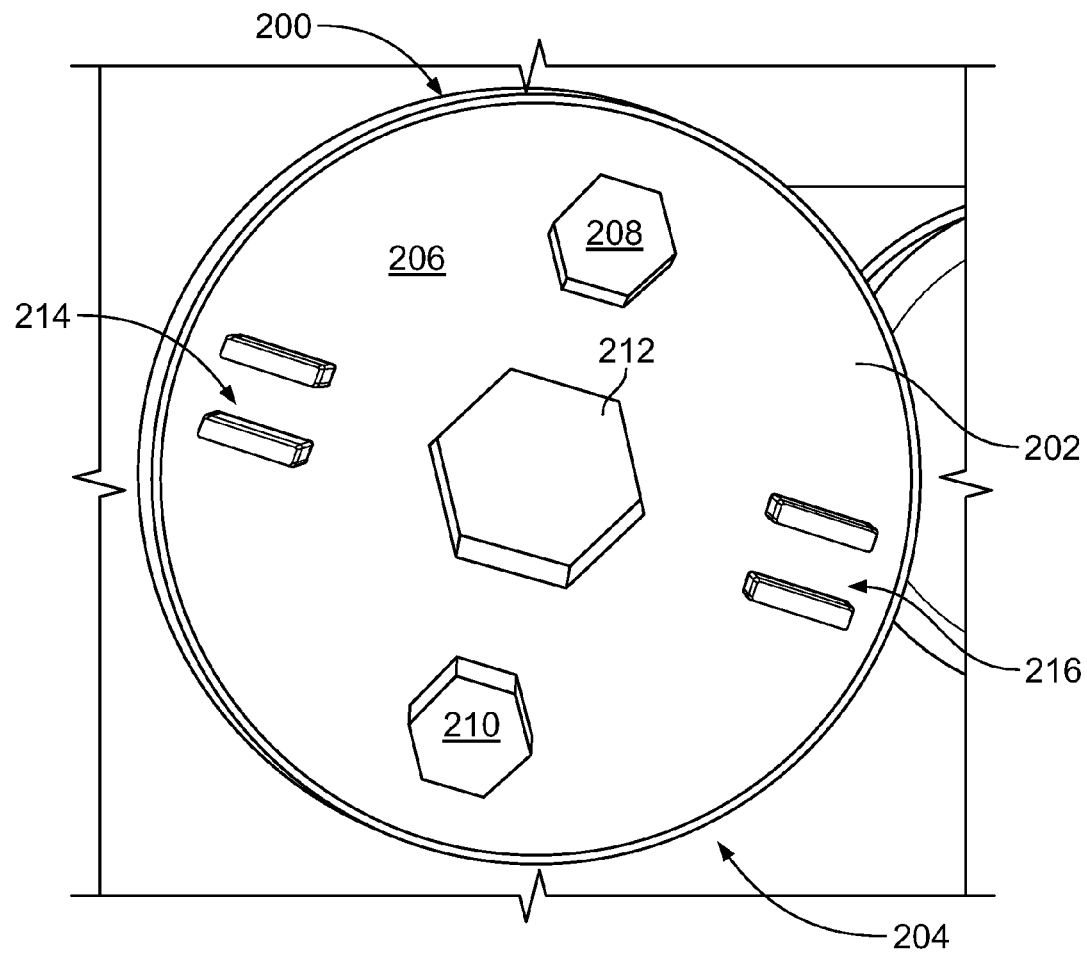
FIG. 2 is a known fluid regulator adjusting screw configured to be adjustable by multiple tools.

Before describing the example adjusting screw in detail, brief descriptions of a fluid regulator 100 having a conventional adjusting screw and a known adjusting screw configured to be adjustable by multiple tools are provided in connection with FIGS. 1 and 2, respectively. FIG. 1 is a cross-sectional view of a fluid regulator 100 having a known adjusting screw configuration. As depicted in FIG. 1, the fluid regulator 100 includes a casing or housing 102 coupled to a valve body 104. The valve body 104 includes a flow control member 106 that engages a valve seat 108 disposed within a fluid flow passageway formed in the valve body 104 to control the flow of fluid between an inlet 110 and an outlet 112. A valve stem 114, via a lever 116, operatively couples the flow control member 106 to a diaphragm 118. The diaphragm 118 applies a force to the lever 116 via a control spring 120 to control the position of the flow control member 106 relative to the valve seat 108.

The casing 102 contains the diaphragm 118 and the control spring 120 that applies a force to the diaphragm 118. The force applied by the control spring 120 to the diaphragm 118 is adjustable via an adjusting screw 122, which can be accessed by removing a cap or plug 124. The adjusting screw 122 of the fluid regulator 100 may be adjustable via, for example, a single hex socket wrench size, a hex-shaped drive member, and/or a standard screwdriver blade.

The adjusting screw 122 can be adjusted (e.g., rotated clockwise) to compress the spring 120, thereby increasing the force applied by the spring 120 to the diaphragm 118. Increasing the force applied by the spring 120 increases the set or outlet control pressure provided by the fluid regulator 100. Likewise, the adjusting screw 122 can be adjusted (e.g., rotated counter-clockwise) to reduce the compression of the spring 122, thereby decreasing the force applied by the spring 120 to the diaphragm 118. Decreasing the force applied by the spring 120 to the diaphragm 118 decreases the set or outlet control pressure provided by the fluid regulator 100.

An example of a known fluid regulator adjusting screw 200 configured to be adjustable by multiple tools is shown in FIG. 2. The known adjusting screw 200 is used with type B34/B38 fluid regulators manufactured by Actaris. Turning in detail to FIG. 2, the adjusting screw 200 has a cylindrical body 202 with threads 204 on its outermost curved surface. The threads 204 are configured to threadingly engage an internally threaded opening of a regulator housing and, in particular, a spring casing of such a regulator, to enable rotatable adjustment of the screw 200 (e.g., to change an outlet control pressure of a regulator).

An end or face 206 of the adjusting screw 200 has a pair of raised portions or hex-shaped bosses 208 and 210, each of which is sized to engage the same size hex socket to enable rotation of the adjusting screw 200 via a socket wrench coupled to one of the bosses 208 and 210. Additionally, the adjusting screw 200 includes a hex-shaped opening 212, which is centered relative to a longitudinal axis of the adjusting screw 200, to receive a hex-shaped drive tool. In this manner, the hex-shaped drive tool can be used to rotate the adjusting screw 200. Finally, the known adjusting screw 200 includes pairs of raised bars 214 and 216 that form opposing slots configured to receive a standard screwdriver blade, thereby enabling a field service technician to rotate the adjusting screw 200 using a screwdriver.

FIGS. 3A and 3B illustrate an example adjusting screw 300 described herein that is configured to be adjustable by multiple tools. As depicted in FIGS. 3A and 3B, the example adjusting screw 300 has a cylindrical body portion 302 having a first end or face 304, a second end or face 306, and a curved outer surface 308. The curved outer surface 308 has threads 310, which are sized to threadingly engage an internally threaded opening (not shown). The cylindrical body portion 302 and threads 310 may be sized to enable the adjusting screw 300 to be used as an adjusting mechanism on a field device such as, for example, a fluid regulator control pressure adjusting screw.

The first end 304 of the example adjusting screw 300 includes a first pair of bosses or raised portions 312 and a second pair of bosses or raised portions 314 opposing the first pair of raised portions 312. The pairs of raised portions 312 and 314 are depicted as being offset equal distances from a longitudinal axis 316 of the adjusting screw 300. However, such offsets do not have to be equal and, thus, the pairs of raised portions 312 and 314 may be spaced in other suitable manners to achieve similar results.

Each of the pairs of raised portions 312 and 314 has a geometry and size to engage a first size socket (depicted as dashed line 318 in connection with the first pair of raised portions 312). The geometry and size of the pairs of raised portions 312 and 314 enable a second size socket (depicted as dashed line 320 in connection with both pairs of raised portions 312 and 314) larger than the first socket to simultaneously engage both pairs of raised portions 312 and 314. In this manner, a socket having either the first size 318 or the second size 320 may be used to turn or rotate the example adjusting screw 300 about the longitudinal axis 316. Preferably, but not necessarily, the first size socket 318 and the second size socket 320 may be used to engage another fastening or adjusting component of a device associated with the adjusting screw 300 and/or another device typically serviced by a service person.

In the example shown in FIGS. 3A and 3B, the raised portions 312 and 314 provide angled surfaces 322, 324, 326, and 328 to engage at least one of the first and second sockets 318 and 320. More specifically, the example raised portions 312 and 314 have angled sides defining the shape of a parallelogram. Further, the raised portions 312 and 314 define respective slots 330 and 332 to receive a standard screwdriver blade to enable the adjusting screw 300 to be rotated about the longitudinal axis 316. In other examples, the slots 330 and 332 may be optionally eliminated and/or each of the raised portions 312 and 314 may be a unitary raised portion or boss rather than pairs of raised portions.

The example adjusting screw 300 may also include a rectangular opening 334 between the first and second pairs of raised portions 312 and 314 that are configured to receive or engage a socket wrench drive member to rotate the adjusting screw 300 about the longitudinal axis 316. In one particular example, the rectangular opening 334 is square and centered relative to the longitudinal axis 316. In other examples, the opening 334 may be any polygonal shape or any other suitable shape to receive a tool member such as, for example, a hex key, to rotate the adjusting screw 300 about the longitudinal axis 316.

Although certain example apparatus have been described herein, the scope of coverage of this patent is not limited thereto. On the contrary, this patent covers all apparatus and articles of manufacture fairly falling within the scope of the appended claims either literally or under the doctrine of equivalents.

What is claimed is:

1. An adjusting screw, comprising:
   a cylindrical body having a first end, a second end, and an outer curved surface;
   a first raised portion on the first end and offset from a longitudinal axis of the cylindrical body, the first raised portion to engage a first hexagonal-shaped socket to turn the cylindrical body about the longitudinal axis, the first raised portion having first peripheral outer surfaces to engage less than all faces of the first hexagonal-shaped socket, wherein at least two adjacent ones of the first peripheral outer surfaces are to be substantially parallel to two respective adjacent faces of the first hexagonal-shaped socket; and
   a second raised portion on the first end and offset from the longitudinal axis of the cylindrical body and opposing the first raised portion, the second raised portion having second peripheral outer surfaces to engage the first hexagonal-shaped socket to turn the cylindrical body about the longitudinal axis, wherein the outer surfaces of the second raised portion engage less than all of the faces of the first hexagonal-shaped socket, wherein at least two adjacent ones of the second peripheral outer surfaces are to be substantially parallel to two respective adjacent faces of the first hexagonal-shaped socket and wherein the at least two adjacent ones of the first and second peripheral outer surfaces are to engage less than all faces of a second hexagonal-shaped socket to turn the cylindrical body about the longitudinal axis, wherein the first hexagonal-shaped socket is smaller than the second hexagonal-shaped socket.

2. An adjusting screw as defined in claim 1, further comprising a rectangular opening between the first and second raised portions, the rectangular opening to directly engage a socket wrench drive member to rotate the cylindrical body about the longitudinal axis.

3. An adjusting screw as defined in claim 2, wherein the rectangular opening is centered relative to the longitudinal axis.

4. An adjusting screw as defined in claim 1, wherein the first and second raised portions define respective first and second slots to receive a screwdriver to rotate the cylindrical body about the longitudinal axis.

5. An adjusting screw as defined in claim 1, wherein the first peripheral outer surfaces define a parallelogram having no right angles.

6. An adjusting screw as defined in claim 1, wherein the first peripheral outer surfaces are to engage only four faces of the first hexagonal-shaped socket, and the first and second peripheral outer surfaces are to engage only four faces of the second hexagonal-shaped socket.

7. An adjusting screw as defined in claim 1, wherein the first raised portion includes a pair of protruding members, wherein each of the protruding members comprises a first outer surface that meets a second outer surface to form a first angle less than ninety degrees, the second outer surface meets a third outer surface to form a second angle greater than ninety degrees, the third outer surface meets a fourth outer surface to form a third angle less than ninety degrees and the fourth outer surface meets the first outer surface to form a fourth angle greater than ninety degrees.

8. An adjusting screw as defined in claim 1, wherein at least one of the first peripheral outer surfaces meets another one of the first peripheral outer surfaces at a non-perpendicular angle.

9. An adjusting screw as defined in claim 1, wherein at least one of the second peripheral outer surfaces meets another one of the second peripheral outer surfaces at a non-perpendicular angle.

10. An adjusting screw as defined in claim 1, wherein all of the first peripheral outer surfaces that are to engage the first hexagonal-shaped socket matably engage the respective faces of the first hexagonal-shaped socket when the first hexagonal-shaped socket is coupled to the first raised portion.

11. An adjusting screw as defined in claim 1, wherein all of the second peripheral outer surfaces that are to engage the second hexagonal-shaped socket matably engage the respective faces of the second hexagonal-shaped socket when the second hexagonal-shaped socket is coupled to the second raised portion.

12. An adjusting screw of claim 1, wherein the first and second peripheral outer surfaces are substantially planar.

13. An adjusting screw, comprising:
a cylindrical body having first and second protrusions spaced apart relative to a longitudinal axis of the cylindrical body, wherein each of the first and second protrusions is to engage a first sized socket to rotate the cylindrical body about the longitudinal axis, wherein the first and second protrusions are oriented to define at least a portion of a footprint of the first sized socket such that surfaces of the first and second protrusions are to matably engage with respective faces of the first sized socket and wherein the first and second protrusions enable a second sized socket larger than the first sized socket to simultaneously engage both the first and second protrusions to rotate the cylindrical body.

14. An adjusting screw as defined in claim 13, wherein at least one of the surfaces of the first protrusion to engage a face of the first sized socket is to be parallel relative to the face of the first hexagonal-shaped socket when the first hexagonal-shaped socket is coupled to the first protrusion.

15. An adjusting screw as defined in claim 14, wherein at least one of the outer surfaces of the first protrusion and at least one of the outer surfaces of the second protrusion are to be parallel relative to respective ones of the faces of the second hexagonal-shaped socket .

16. An adjusting screw as defined in claim 13, wherein each of the first and second protrusions enables a hexagonal-shaped socket to engage the respective first and second protrusions.

17. An adjusting screw of claim 13, wherein each of the first and second protrusions includes at least first and second surfaces that meet to form a first corner having an angle less than ninety degrees and third and fourth surfaces that meet to form a second corner having an angle greater than ninety degrees.

18. An adjusting screw as defined in claim 17, wherein the first corner is opposite the second corner.

19. An adjusting screw of claim 13, wherein the cylindrical body has a first end, a second end, a longitudinal axis, and an outer curved surface.

20. An adjusting screw as defined in claim 19, wherein at least a portion of the outer curved surface has threads to engage an internally threaded opening, and the cylindrical body has a rectangular opening to directly engage a socket wrench drive member to rotate the cylindrical member about the longitudinal axis.

21. An adjusting screw as defined in claim 20, wherein the rectangular opening is coaxially aligned relative to the longitudinal axis.

22. An adjusting screw as defined in claim 20, wherein the cylindrical body and the threads are for use with a fluid regulator.

23. An adjusting screw for use with a fluid regulator, comprising:
means for adjustably engaging a threaded opening of the fluid regulator;
first means for engaging a first hex-shaped socket to turn the adjusting screw, the first means for engaging having outer surfaces that engage less than all faces of the first hex-shaped socket and the outer surfaces of the first means for engaging are oriented to define at least a portion of a first hexagonal footprint of the first hex-shaped socket such that at least one outer surface of the first means for engaging matably engages a respective face of the first hex-shaped socket when the first hex-shaped socket is coupled to the first means for engaging; and
second means for engaging the first hex-shaped socket spaced apart from the first means for engaging the first hex-shaped socket, the second means for engaging having outer surfaces that engage less than all faces of the first hex-shaped socket and the outer surfaces of the second means for engaging are oriented to define at least a portion of the first hexagonal footprint of the first hex-shaped socket such that at least one outer surface of the second means for engaging matably engages a respective face of the first hex-shaped socket when the first hex-shaped socket is coupled to the second means for engaging; and third means for engaging a second hex-shaped socket, wherein a portion of the first means for engaging and a portion of the second means for engaging define the third means for engaging the second hex-shaped socket, wherein the first hex-shaped socket has a first size and the second hex-shaped socket has a second size different than the first size.

24. An adjusting screw as defined in claim 23, further comprising means for receiving a square socket drive member.

25. An adjusting screw as defined in claim 23, wherein the means for adjustably engaging comprises means for threadably engaging an internally threaded opening of the fluid regulator.

26. An adjusting screw as defined in claim 23, wherein each of the first and second means for engaging the first socket comprises respective first and second raised portions.

27. An adjusting screw as defined in claim 23, wherein each of the first and second means for engaging the first socket comprises means for receiving a screwdriver blade.

28. An adjusting screw of claim 23, wherein the first and second means for engaging are oriented to define at least a portion of a third hexagonal footprint of the second hex-shaped socket such that each portion of the first and second means for engaging to engage the second hex-shaped socket matably engages with a respective face of the second hex-shaped socket.

* * * * *